Aug. 20, 1929.        J. CAMPBELL        1,725,055

SHOCK ABSORBER FOR VEHICLES

Filed Aug. 8, 1928

INVENTOR
JOHN CAMPBELL
BY Fethustonhaugh&Co
ATTORNEYS

Patented Aug. 20, 1929.

1,725,055

UNITED STATES PATENT OFFICE.

JOHN CAMPBELL, OF GLASGOW, SCOTLAND.

SHOCK ABSORBER FOR VEHICLES.

Application filed August 8, 1928, Serial No. 298,319, and in Canada August 4, 1928.

This invention relates to new and useful improvements in shock absorbers, or bumpers, for vehicles and the general object of the invention is to provide a bumper of simple construction which may be easily attached to the vehicle to protect same.

Another object of the invention is to provide a flexible bumper which will not mar or damage the object with which it comes in contact.

A further object is to provide a bumper in which the shock due to collision with any object will be partially or totally taken up by the resiliency of the bumper and the pressure due to said collision gradually and evenly applied to the frame of the vehicle.

A still further object is to provide a flexible bumper which will readily adapt itself to the configuration of the object with which it comes in contact.

A still further object is to provide a bumper which will not be damaged by collision and the like.

According to my invention I provide a bumper made of rubber or some such resilient material, said bumper being attached to the vehicle by means of levers pivotally mounted on brackets. The levers are pivotally mounted about their centres and the bumper is attached to one end of said levers, while a tensioning member of some resilient material is attached to the other ends to absorb the shock and to distribute same to the vehicle frame.

In the drawings which illustrate one form of my invention:—

Figure 1:
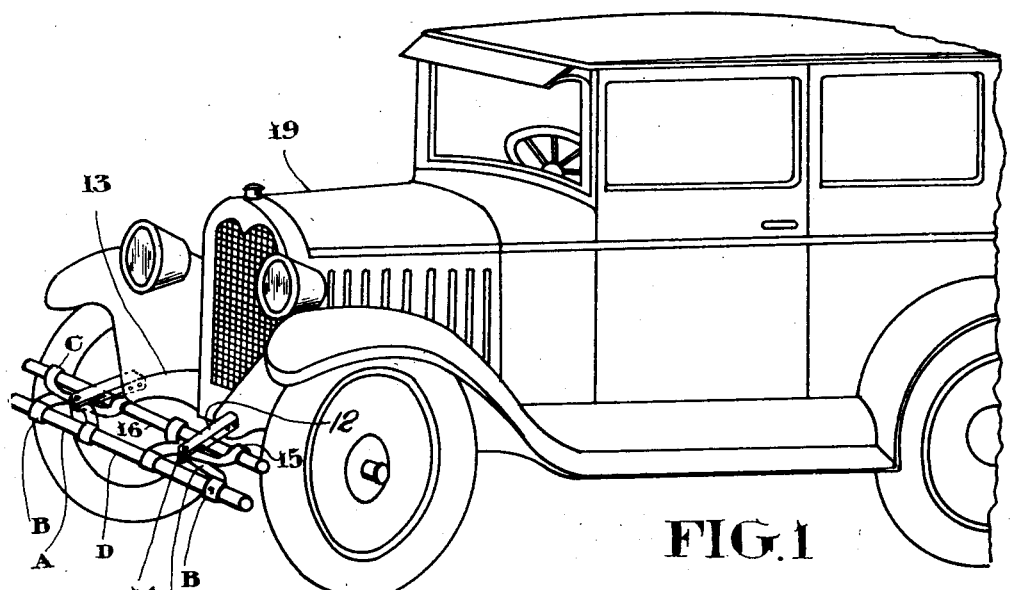
Figure 1 is a part perspective elevation of an automobile with my improved bumper attached to the front thereof.
Figures 2, 3:
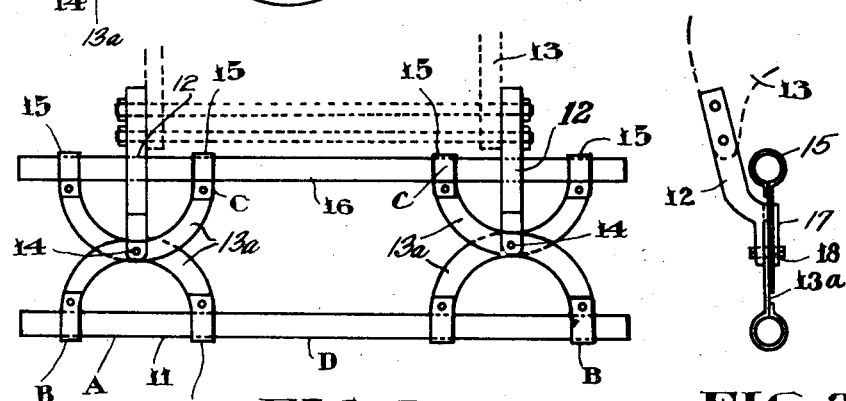
Figure 2 is a plan view of my improved bumper.
Figure 3 is an end elevation of the bumper shown in Figure 2.

Referring more particularly to the drawings, 11 designates the bumper of the shock absorber. This member, which is made of rubber or like resilient material, extends transversely of the vehicle and beyond the sides of same. Mounted in brackets 12 secured to the frame 13 of the vehicle are the levers 13ª, one end of each of which is secured in any suitable manner to the member 11. In the drawings I have shown said ends bent around the member and bolted to hold the member in position. The levers are pivoted about pins 14 passing through the brackets 12 and through the centers of the levers. Secured to the other ends 15 of the levers is the tensioning member 16 which also is made of resilient material, preferably round rubber. The bumper 11 and the tensioning member are normally under the same tension. It will be seen that there are two levers pivotally secured to each bracket and their ends are spaced from one another on the bars so that the front and rear members are connected together by two sets of levers arranged in scissors fashion, so that the shock at any part of the front member immediately tensions the rear member or part thereof.

Figure 4:
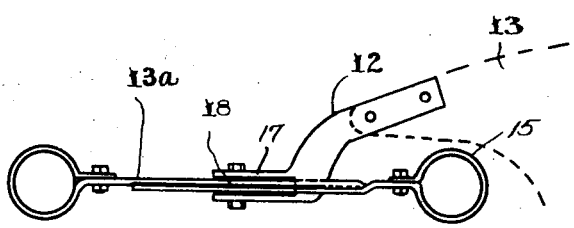
Figure 4 is an enlarged end view similar to that shown in Figure 3.

In Figure 4, the ends 17 of the brackets 12 are bifurcated and the levers are shown with a washer 18 between them to reduce the wear of the levers at their pivot points to a minimum.

In Figure 1, the device is shown attached to the front part of the frame of the automobile 19 but it will be readily understood that the device may be applied to the rear of the vehicle in a similar manner.

In operation, when the vehicle strikes an object, say at the point marked A, the rubber front bumper member being of a resilient nature, conforms to the shape of the part of the object with which it comes in contact. This tends to draw the ends B of the levers together and tends to spread the ends C which are connected by the resilient tensioning member so that the shock is gradually absorbed by the bumping member and tensioning member without shock to the frame. When the bumper comes in contact with an object between the levers, as at the point D, the shock is absorbed and evenly distributed by the tensioning member, and between the remote lever connections to the tensioning member.

The device is of simple construction and may be quickly and easily applied to the frame of any vehicle. The resilient members, when they come in contact with an object, will not mar or damage said object. The bumper regains its original shape after the shock has been absorbed and the automobile brought to a stand still.

It will be readily understood that modifications may be made in the construction of the various parts of the device without departing from the spirit of the invention.

Having thus described my invention, what I claim is:—

1. In a shock absorber for vehicles, a bumper of resilient material, a tensioning member of similar material spaced from the bumper, levers connecting the bumper with the tensioning member and means secured to the vehicle and adapted to support the levers approximately mid-way between the bumper and the tensioning member.

2. In a shock absorber for vehicles, an elastic bumper, spaced brackets extending outwardly from the front of the vehicle, levers pivotally secured to the brackets and each adapted at one end to support the bumper and an elastic member secured at the other ends of the said levers to tension the bumper.

3. In a shock absorber for vehicles, an elastic bumper extending transversely of the vehicle, and an elastic tensioning member extending substantially parallel to the bumper, levers connecting the bumper and the tensioning member, said levers being arranged in pairs connected together by a pivot pin, and means engaging with the pivot pins for attaching the device to the vehicle.

4. In a shock absorber for vehicles, an elastic bumper, extending transversely of the vehicle, an elastic tensioning member substantially parallel to the bumper, levers connecting the bumper with the tensioning member, said levers being arranged in pairs pivoted on a pin approximately mid-way between the ends of the levers, said ends being spaced from one another on the bumper and the tensioning members, and means engaging with the pins for securing the device to a vehicle.

In witness whereof, I have hereunto set my hand.

JOHN CAMPBELL.